United States Patent
Fitzgerald et al.

(10) Patent No.: US 10,880,215 B2
(45) Date of Patent: Dec. 29, 2020

(54) SYSTEMS AND METHODS FOR PROVIDING I-SID TRANSLATION IN SPB NETWORKS

(71) Applicant: Extreme Networks, Inc., San Jose, CA (US)

(72) Inventors: Deborah Ellen Fitzgerald, Acton, MA (US); Srikanth Keesara, Tewksbury, MA (US)

(73) Assignee: Extreme Networks, Inc., San Jose, CA (US)

(*) Notice: Subject to any disclaimer, the term of this patent is extended or adjusted under 35 U.S.C. 154(b) by 0 days.

(21) Appl. No.: 15/840,353

(22) Filed: Dec. 13, 2017

(65) Prior Publication Data

US 2019/0182158 A1    Jun. 13, 2019

(51) Int. Cl.
| | |
|---|---|
| *H04L 12/28* | (2006.01) |
| *H04L 12/741* | (2013.01) |
| *H04L 12/707* | (2013.01) |
| *H04L 29/06* | (2006.01) |
| *H04L 12/715* | (2013.01) |
| *H04L 29/12* | (2006.01) |
| *H04L 29/08* | (2006.01) |

(52) U.S. Cl.
CPC ............ *H04L 45/745* (2013.01); *H04L 45/04* (2013.01); *H04L 45/24* (2013.01); *H04L 45/64* (2013.01); *H04L 45/74* (2013.01); *H04L 61/106* (2013.01); *H04L 67/2823* (2013.01); *H04L 67/42* (2013.01); *H04L 69/22* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 9,203,644 B2* | 12/2015 | Holness | ............... H04L 12/427 |
| 2008/0159309 A1 | 7/2008 | Sultan et al. | |
| 2008/0172497 A1* | 7/2008 | Mohan | ............... H04L 12/4616 709/249 |

(Continued)

FOREIGN PATENT DOCUMENTS

KR    101283466 B1    8/2013

OTHER PUBLICATIONS

Media Access Control (MAC) Bridges and Virtual Bridged Local Area Networks—Amendment XX: Shortest Path Bridging, P802.1aq/D4.6, Draft Amendment to IEEE Std 802.1Q-2011, Feb. 10, 2012, 363 pages.

(Continued)

*Primary Examiner* — Gerald A Smarth
(74) *Attorney, Agent, or Firm* — Sterne, Kessler, Goldstein & Fox P.L.L.C.

(57) ABSTRACT

Systems, methods, and apparatuses are disclosed herein for providing an Individual Service Instance identifier ("I-SID") translation service for accessing services on different networks. Packets designated for specific services via an I-SID Tag may be received at an edge network device and a lookup may be performed to locate the service on another network via the I-SID corresponding to the service, the I-SID being mapped at another network. The I-SID may be updated with the newly-located I-SID in order for the packet to reach an appropriate service on the other network.

20 Claims, 6 Drawing Sheets

(56) References Cited

U.S. PATENT DOCUMENTS

| | | | | |
|---|---|---|---|---|
| 2009/0196298 | A1* | 8/2009 | Sajassi | H04L 45/50 370/395.53 |
| 2009/0310535 | A1* | 12/2009 | Anumala | H04W 8/26 370/328 |
| 2012/0063363 | A1* | 3/2012 | Li | H04L 12/4645 370/255 |
| 2012/0243545 | A1* | 9/2012 | Zhang | H04L 12/4625 370/395.53 |
| 2013/0077624 | A1* | 3/2013 | Keesara | H04L 12/4662 370/390 |
| 2013/0195111 | A1 | 8/2013 | Allan et al. | |
| 2013/0322453 | A1 | 12/2013 | Allan | |
| 2014/0086244 | A1 | 3/2014 | Keesara | |
| 2014/0092910 | A1* | 4/2014 | Valentine | H04L 45/122 370/395.53 |
| 2014/0258412 | A1 | 9/2014 | Li et al. | |
| 2015/0156108 | A1* | 6/2015 | Shi | H04L 12/4633 370/218 |
| 2015/0188780 | A1* | 7/2015 | Spieser | H04L 41/5009 370/252 |
| 2017/0223104 | A1* | 8/2017 | Keesara | H04L 43/14 |

OTHER PUBLICATIONS

"3.3 Inter VSN Routing," Avaya Inc., p. 27, Dec. 2015.

Fairhurst, G., "Unicast, Broadcast, and Multicast," Oct. 3, 2009, http://www.erg.abdn.ac.uk/users/gory/course/intr-pages/uni-b-mcast.html, 2 pages, printed Oct. 12, 2016.

"H3C S12500 Series Routing Switches SPB Configuration Guide," Hangzhou H3C Technologies Co., Ltd., 59 pages, Copyright 2014-2015.

International Search Report and Written Opinion, for PCT Appl. No. PCT/US18/65127, 13 pages, dated Mar. 15, 2019.

"Shortest Path Bridging (802.1aq) Technical Configuration Guide," Doc. No. NN48500-617, Version 2.3, Extreme Networks, 258 pages, Dec. 2017.

"Understanding PBB—Knowledge Base," https://sites.google.com/site/amitsciscozone/home/pbb/understanding-pbb, 18 pages, printed Oct. 12, 2016.

* cited by examiner

600

602
Receive a packet that is directed to a first service instance of a service, wherein the first service instance is mapped to a first I-SID

604
Determine, at the first edge network device, that the packet is addressed to a second edge network device of the second network

606
In response to determining that the packet is addressed to the second edge network device of the second network, perform, at the first edge network device and using the first I-SID, a lookup of a second I-SID that is mapped to a second service instance of the service, wherein the second service instance of the service resides on the second network

608
Update a header of the packet to replace the first I-SID with the second I-SID

610
Transmit the packet to the second network

FIG. 6

SYSTEMS AND METHODS FOR PROVIDING I-SID TRANSLATION IN SPB NETWORKS

BACKGROUND OF THE INVENTION

Shortest Path Bridging ("SPB"), specified in the IEEE 802.1aq standard, is a computer networking technology intended to simplify the creation and configuration of networks, while enabling multipath routing. Shortest Path Bridging—MAC ("SPBM") is a related technology that enables packets to be sent and received using Mac-in-Mac ("MiM") encapsulation. Each MiM packet header may include a service instance identifier ("I-SID"). The I-SID may be associated with a specific service or application that may be accessed through that I-SID. In many instances packets may need to traverse between different networks (e.g., between private and public networks) to access the application via the I-SID. In each of these networks (sometimes known as domains) the I-SIDs may be mapped differently.

SUMMARY

Therefore, I-SID translation may be required to traverse these networks. Thus, a method for providing Individual Service Instance Identifier ("I-SID") translation for services residing on a second network being accessed from a first network is disclosed herein. An edge network device of a network where a request for the service originates may perform the actions that will be described below. In some embodiments, an edge network device of a network that is hosting the service requested may perform the actions. In yet another embodiment, device on an intermediate network may perform the actions.

In some aspects, a first edge network device may receive a packet that is directed to a first service instance of a service, where the first service instance is mapped to a first I-SID. For example, the first edge network device may receive a packet for I-SID number ten that is mapped to service A on network one.

The edge network device may examine the packet to determine where the packet is to be transmitted. Specifically, the first edge network device may determine that the packet is addressed to a second edge network device of the second network. For example, the first edge network device may determine that the packet is addressed to an edge network device on network two.

In response to determining that the packet is addressed to an edge network device on another network, the first edge network device may perform an I-SID translation operation. Specifically, in response to determining that the packet is addressed to the second edge network device of the second network, the first edge network device may perform a lookup of a second I-SID that is mapped to a second service instance of the service, where the second service instance of the service resides on the second network. For example, the edge network device may determine that I-SID ten on network one corresponds to I-SID eighty on network two.

The edge first edge network device may update a header of the packet to replace the first I-SID with the second I-SID and transmit the packet to the second network. For example, the first edge network device may access the header of the packet and identify the entry within the header that corresponds to the I-SID. The edge network device may replace the I-SID with the I-SID located as part of the lookup. The edge network device may transmit the modified packet to the next hop.

In some embodiments, the edge network device may, when transmitting the packet to the second network, determine that there is a specific destination MAC address for the I-SID that was inserted into the packet, and, based on that determination, update the destination MAC address with the MAC address that corresponds to the I-SID. Specifically, the edge network device may determine whether the second I-SID is mapped to a Media Access Control ("MAC") address of the second edge network device of the second network and, in response to determining that the second I-SID is mapped to the MAC address of the second edge network device of the second network, update the header of the packet to replace a Backbone Destination Address ("B-DA") with the MAC address of the second edge network device. For example, the edge network device may update address "00:11:22:33:44:55 with address "33:33:33:33:33:33" corresponding to the appropriate edge network device.

In some embodiments, when performing the lookup operation, the first edge network device may use a lookup table. Specifically, the edge network device may access a table that stores mappings between I-SID values on the first network and corresponding I-SID values on the second network and retrieve, from the table, based on the first I-SID, a value for the second I-SID. For example, the edge network device may access a table in memory, the table including mappings for I-SIDS on different networks. It should be noted that the table may be configured to contain entries for different services with each entry including fields for a service identifier, a first network identifier for the first network, an I-SID for the first network, a second network identifier, and an I-SID for the second network.

In some embodiments, the table may be stored on a device different from both the first edge network device and the second edge network device. For example, the table may be stored on a server, a router, a switch, or another suitable network device. It should be noted that copies of the table may be stored on other devices. In addition, the copies of the tables may be updated on different device using a pre-defined protocol.

In some embodiments, the edge network device may build a table of I-SID mappings by executing a predefined protocol. Specifically, the edge network device may detect, on both the first network and the second network, the first service instance of the service and the second service instance of the service. For example, the edge network device may use the pre-defined protocol to scan the first network and the second network for any services and corresponding I-SID tags.

The edge network device may identify, on the first network, the first I-SID that is mapped to the first service instance of the service, and, on the second network, the second I-SID that is mapped to second service instance of the service. For example, the edge network device may identify service A with I-SID 10 on the first network and I-SID 80 on the second network. The edge network device may store, in a table, a mapping between the first I-SID and the second I-SID. For example, the edge network device may create a table entry for service A, storing an identifier of service A together with I-SID 10 and an identifier of the first network and I-SID 80 and the identifier of the second network.

In some embodiments, the table may be stored in one or more network devices. Specifically, the table may be stored on at least one of the first edge network device and the second edge network device. In some embodiments, the table may be stored on both the first edge network device and the second edge network device and the I-SID translation operation may be performed on each device. In the embodiments, where the first edge network device and the second edge network device, the edge network device that updates the I-SID value/tag may further update the packet to indicate to the other device that the update has been completed. In some embodiments, each edge network device may be configured to update the packets that come in from local networks, but refrain from updating the packets that come in from remote networks (e.g., for example, because they have already been updated by anther edge network device).

In some embodiments, the edge network device may store in the table MAC addresses corresponding to the I-SIDs for particular networks. Specifically, the first edge network device may detect, using the predefined protocol on the first network, a first Media Access Address ("MAC") address for addressing packets directed to the first I-SID, and, on the second network, a second MAC address for addressing packets directed to the second I-SID. For example, the first edge network device may detect that address "00:11:22:33:44:55 corresponds to I-SID 10 on the first network and address "33:33:33:33:33:33" corresponds to I-SID 80 on the second network, where both I-SIDs correspond to the same service.

The first edge configuration device may store in the table the first MAC address corresponding to the first I-SID and the second MAC address corresponding to the second I-SID. For example, the first edge configuration device may complete the table entry with 00:11:22:33:44:55 and "33:33:33:33:33:33" addresses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 depicts an illustrative flowchart of a process for providing I-SID translation services across networks, in accordance with some embodiments of the disclosure.

DETAILED DESCRIPTION

Systems, methods, and apparatuses are disclosed herein for providing an Individual Service Instance identifier ("I-SID") translation service for accessing services on different networks. As referred herein, the term I-SID refers to an identifier that is associated with a specific service. For example, a network services provider (e.g., a cloud provider) may be using Shorted Path Bridging ("SPB") technology for routing packets. A specific service may be mapped to a certain Virtual Machine ("VM") and an I-SID may be assigned to the hypervisor that controls that VM. The cloud provider may have public and private networks that the provider offers to the provider's clients. Connections to the public networks may come over the Internet, while the private networks (sometimes known as private clouds) may have specific reserved I-SIDs that the provider associates with specific Virtual Service Nodes ("VSNs") or specific VMs. A problem that each provider might have is a requirement to change internal I-SID allocations when new customers sign up for the service in order to accommodate those customers, especially if two customers have identical I-SID allocations. Likewise, customers may have their own I-SID allocations which are different from those of the provider. Thus, those customers may be forced to update their I-SID allocations to accommodate the provider. I-SID translation mechanisms disclosed herein may be used to alleviate these issues.

The example above is by no means limiting to the situation that is encountered with network providers adding new customers. This process may be useful to any network to network transversal. It may especially be beneficial to networks where there is no global I-SID configuration between networks. Merging corporations with conflicting private I-SID spaces may benefit from the translation mechanism. In general, any entity (e.g., corporation) does not need to consider I-SID usage when picking a network provider (e.g., a cloud provider).

Figure 1:
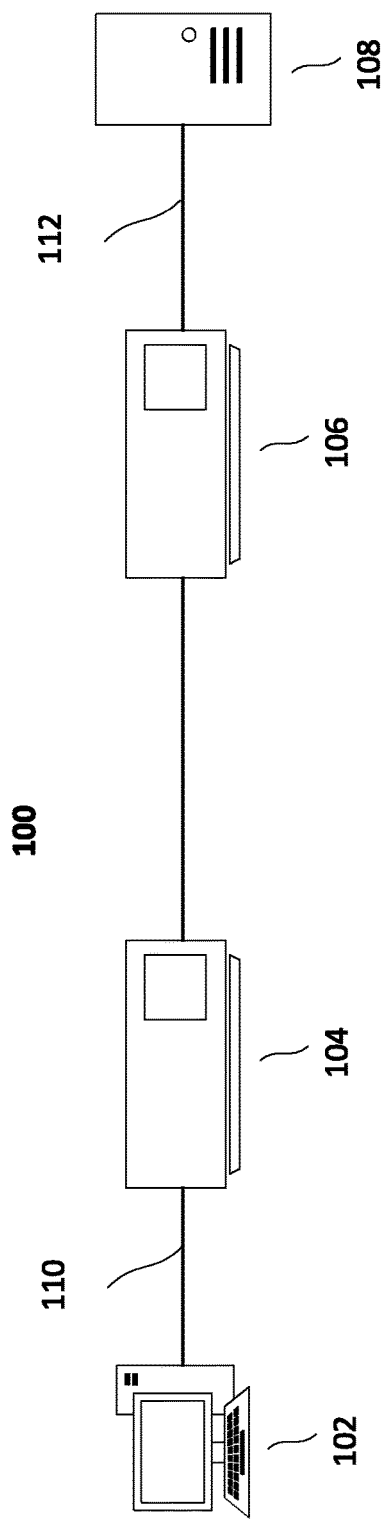
FIG. 1 depicts an illustrative system implementing an I-SID translation mechanism, in accordance with some embodiments of the disclosure.

FIG. 1 depicts an illustrative system 100 implementing an I-SID translation mechanism, in accordance with some embodiments of the disclosure. The I-SID translation process may be initiated by a device (e.g., edge network device 104) that may be accessed from the requesting network. This device may be referred to as an edge network device. For example, the edge network device may be routing packets between a public and private SPB networks. For example, client device 102 may be connected to a private network (e.g., private network 110 of FIG. 1) and server device 108 may be connected to a public network (e.g., public network 112 of FIG. 1).

Virtual Extensible Local Area Network ("VXLAN") is a technology that may be used to enable packets to traverse these networks. Specifically, VXLAN may be used to encapsulate packets that traverse the edge network device. For example, VXLAN may be used to transmit a packet from client device 102 to server device 108 by traversing edge network devices 104 and 106. A virtual remote interface ("VRI") may be configured on the private network (e.g., on an edge network device 104) and an I-SID may be mapped to the VRI. For example, edge device 104 may be configured for a number of VRIs. When a packet arrives at the VRI (e.g., because the packet is associated with the mapped I-SID), the I-SID translation mechanism may perform a lookup for a matching I-SID on the other network (e.g., the public network), and modify the packet with the new I-SID (e.g., by replacing the original I-SID with the new I-SID obtained by performing a lookup.

Figure 2:
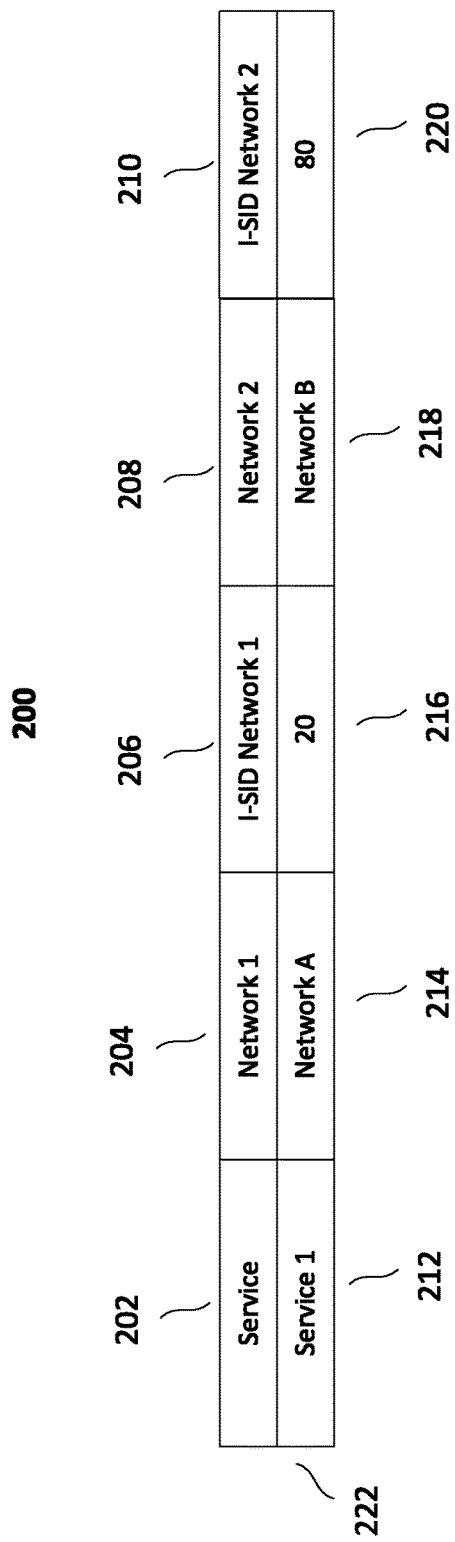
FIG. 2 depicts an illustrative table for storing I-SID mappings between networks, in accordance with some embodiments of the disclosure.

FIG. 2 depicts an illustrative table for storing I-SID mappings between networks. The table may be stored on edge network device 104, edge network device 106, or another device such as a server or another network device (not shown). The lookup may be performed by using lookup table 200 that maps I-SIDs for specific services or applications on one network to I-SIDs on another network. Table 200 as illustrated in FIG. 2 may include a number of field identifiers. Field type 202 may be used to store a service that the mapping identifies while field types 202 and 204 may store a first network identifier and the I-SID for the network associated with the first network identifier, respectively. Field types 208 and 210 may store a second network identifier and an I-SID associated with the second network for the service, respectively. Mapping entry 222 illustrates the user of the fields to store a mapping. Fields 212, 214, 216, 218, and 220 represent fields for entry 222, where field 212 stores a service identifier "Service 1" indicating that the mapping in entry 222 is for "Service 1." Fields 214 and 216 store a network identifier "Network A" and I-SID 20, respectively. These field represent the mapping for "Service 1" on network A. Fields 218 and 220 represent the mapping on "Network B" for "Service 1," where Network B and I-SID 80 are stored.

The table may be generated by a person or persons entering known I-SID information or by scanning different networks using a specific protocol for I-SID information. The table may store more than just I-SIDs for specific services.

In some embodiments, the table may store Backbone Media Access Control addresses ("B-MAC") addresses (sometimes known as Backbone Destination Addresses ("B-DAs")) corresponding to addresses of devices that are able to accept packets for those specific I-SIDs. For example, in embodiments where the I-SID space is not Global there may be no way to route the packet to the new I-SID because the edge network device does not know which other network device can access the new I-SID. Thus, in some embodiments, the lookup table may include B-DA addresses for each specific I-SID. In these embodiments, the B-DA is also modified (in addition to the I-SID) in order to route the packet to a network device that is able to access the service on the new I-SID. It should be noted that a B-DA may be a B-MAC address.

Figure 3:
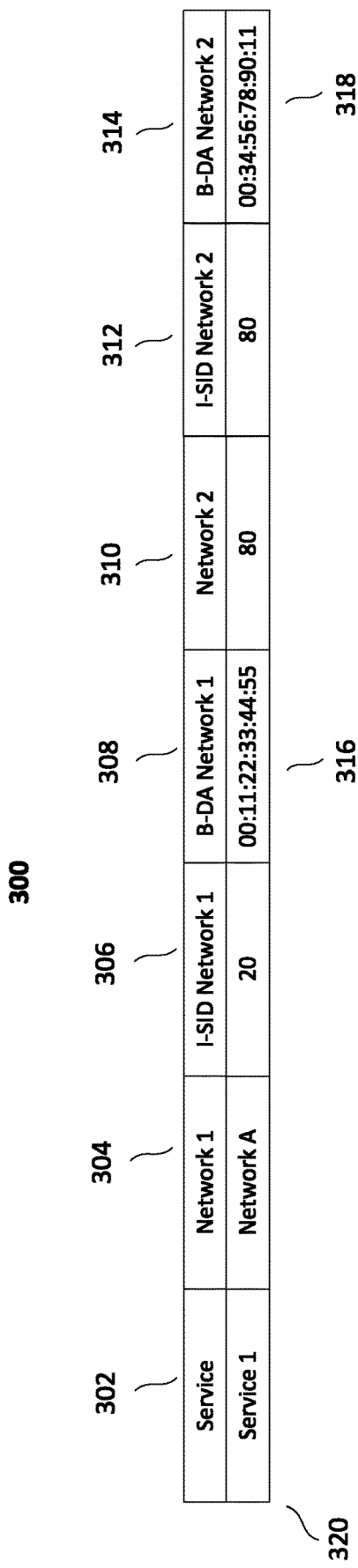
FIG. 3 depicts an illustrative table for storing I-SID mappings between networks, the mappings including Backbone Destination Address information, in accordance with some embodiments of the disclosure.

FIG. 3 depicts an illustrative table 300 for storing I-SID mappings between networks together with backbone destination address information for each I-SID, respectively the mappings including Backbone Destination Address information. Table 300 may include fields type 302 that may be used to store a service that the mapping identifies while field types 304, 306, and 308 may store a first network identifier, the I-SID for the network associated with the first network identifier, and a B-DA for Network 1, respectively. Field types 310, 312, and 314 may store a second network identifier, the I-SID for the network associated with the second network identifier, and a B-DA for Network 2, respectively. Entry 320 may be identical to entry 220 of FIG. 2, except additional fields 316 and 318 may be added to store B-DA for network A and B-DA for network B, respectively.

In some embodiments, the B-DA (e.g., B-MAC) mapping may be stored in a different table from the I-SID table. This table may also be generated manually (e.g., by an administrator(s)) or automatically by a protocol that can traverse the networks and may map I-SIDs to B-DAs on specific networks.

Figure 4:
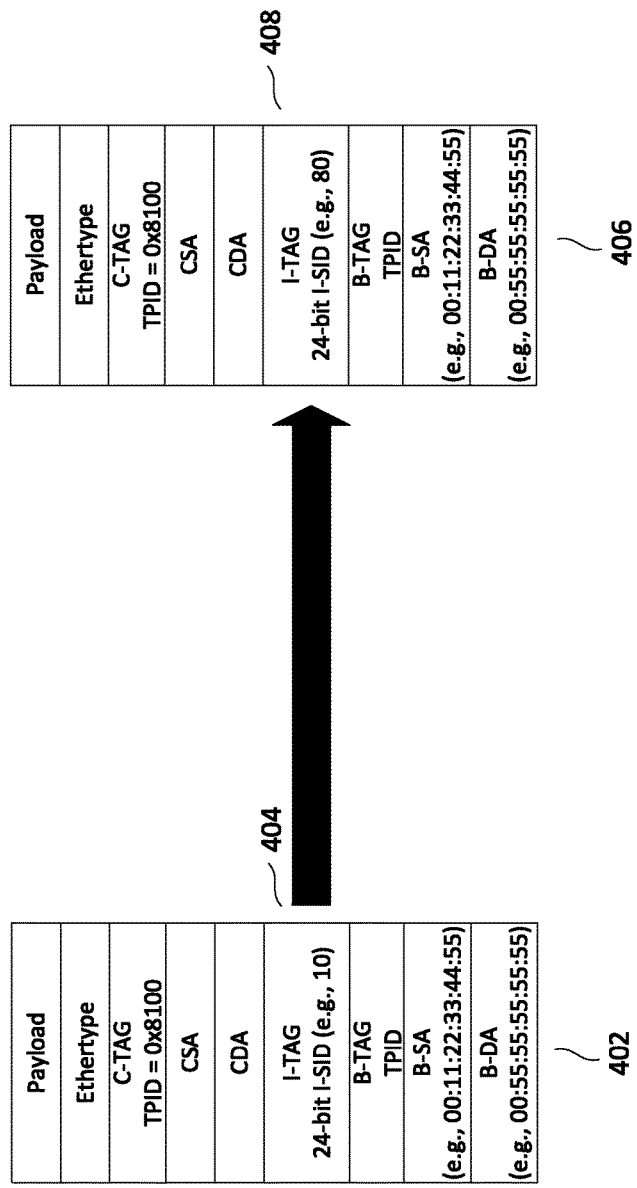
FIG. 4 depicts an illustrative packet update, in accordance with some embodiments of the disclosure.

When the lookup is completed, the edge network device may update the packet with a new I-SID. FIG. 4 depicts an illustrative packet update 400. Packet 402 arrives at the edge network device (e.g., a router, a switch, or another suitable edge network device). Packet 402 may have a number of fields including payload, ethertype, and other customer fields. The relevant field for the I-SID translation is the I-TAG field 404. I-TAG field 404 is a 24-bit I-SID that is included in the packet. As described above, the I-SID is mapped to a specific service being requested. The edge network device upon determining the new I-SID as described above (e.g., using a lookup table) rewrites field 404 with a new I-TAG (e.g., a new 24-bit I-SID value of 80), thereby, changing packet 402 into packet 406.

Figure 5:
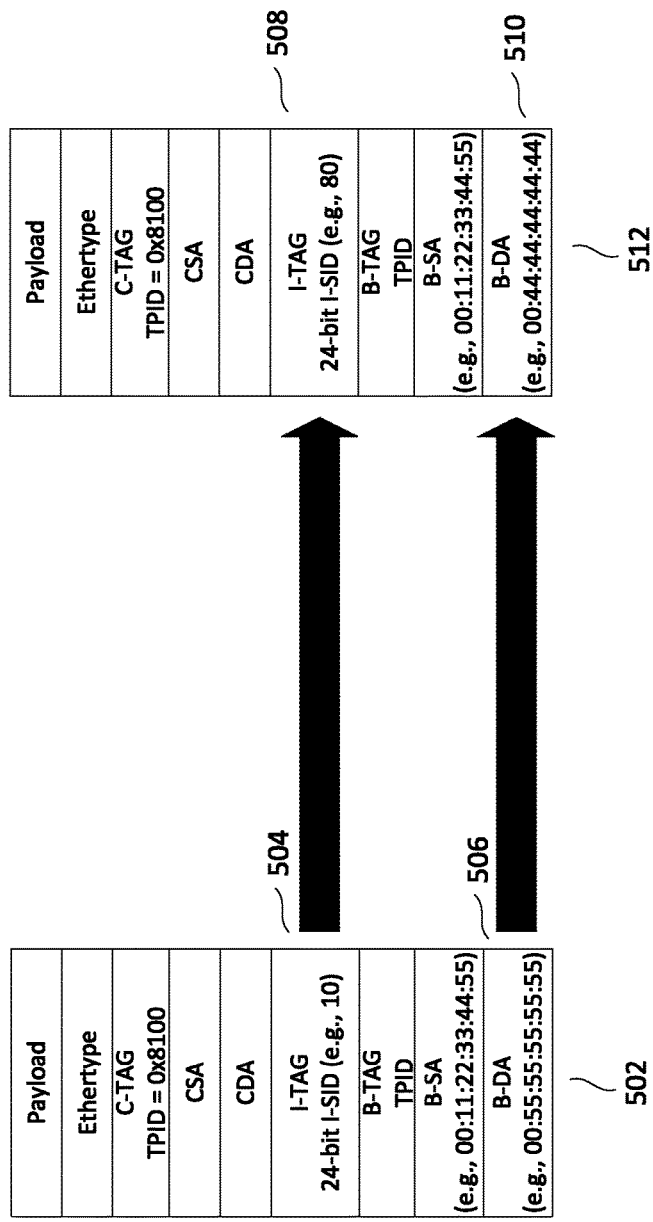
FIG. 5 depicts another illustrative packet update, in accordance with some embodiments of the disclosure.

FIG. 5 depicts illustrative packet update 500 where the I-SID space is not global. Packet 502 illustrates a packet that arrives at the edge network device (e.g., a switch, router, or another suitable device). In this embodiment, I-TAG 504 is updated to I-TAG 508 as described in relation to FIG. 4. However, in this embodiment B-DA address 506 is updated with B-DA address 510. In order to update the B-DA address, the edge network device, may perform a lookup (e.g., as illustrated in a table entry of FIG. 3) and retrieve the B-DA address to perform the update. As a result of the update packet 502 is updated into packet 512.

In some embodiments, the edge network device may translate the I-SID information from one domain to another by terminating and recreating the packet. Specifically, the B-SA, B-DA, and I-SID entries in a packet header may be modified with information of the new interface (e.g., an edge device for a destination network). In these instances, the packet is copied and re-encapsulated so it can be sent to the proper destination.

FIG. 6 depicts an illustrative flowchart of a process for providing I-SID translation services across networks. Process 600 begins at 602. At 602, a first edge network device (e.g., edge network device 104) receives a packet (e.g., from client device 102) that is directed to a first service instance of a service (e.g., Server 1 of FIG. 2), where the first service instance is mapped to a first I-SID (e.g., I-SID 216 of FIG. 2). For example, the edge network device may receive a packet from a workstation or a server on a client's (e.g., private network 110). The packet may be designated for a specific service (e.g., Service 1 of FIG. 2) that is mapped to a specific I-SID (e.g., I-SID 216 FIG. 2) at the client's network (e.g., network 110).

At 604, the first edge network device (e.g., edge network device 104) determines that the packet is addressed to a second edge network device (e.g., edge network device 106) of the second network (e.g., public network 112). For example, the destination address of the packet may be a MAC address on a second network (e.g., public network 112). Based on that information, the first edge network device (e.g., edge network device 104) may determine that the packet is to be directed to a second network (e.g., public network 112).

At 606, the first edge network device (e.g., edge network device 104), in response to determining that the packet is addressed to the second edge network device (e.g., edge network device 106) of the second network (e.g., public network 112), performs, using the first I-SID (e.g., I-SID 404 of FIG. 4 and/or I-SID 216 of FIG. 2), a lookup of a second I-SID (e.g., I-SID 408 of FIG. 4 and/or I-SID 220 of FIG. 8) that is mapped to a second service instance of the service, where the second service instance of the service resides on the second network (e.g., public network 112 of FIG. 1). For example, the first edge network device may access a table (e.g., table 200) which may reside in memory or on another device such as a server, switch, router, or another suitable device) which includes I-SID mappings for various services. The first edge network device may locate one or more entries for the I-SID in the packet (e.g., I-SID 404 of FIG. 4) and based on that locate, in the table (e.g., table 200 of FIG. 2), the corresponding I-SID (e.g., I-SID 210 of FIG. 2) on a second network (e.g., public network 112). The first edge network device may retrieve the new I-SID from the table.

At 608, the first edge network device (e.g., edge network device 104), updates a header (e.g., header 402) of the packet to replace the first I-SID (e.g., I-SID 404) with the second I-SID (e.g., I-SID 408). For example, the first edge network device may traverse the packet header for the received packet and locate a field that includes the I-SID (e.g., 24-bit I-SID tag). The first edge network device may replace the I-SID with the retrieved I-SID. At 610, the first edge network device transmits the packet (e.g., packet 406 of FIG. 2 as modified) to the second network (e.g., public network 112). For example, the first edge network device 104 may transmit the packet to a second edge network device 106 on the second network 112.

The foregoing describes systems, methods, and apparatuses for providing I-SID translation services across networks. The above-described embodiments of the present disclosure are presented for the purposes of illustration and not of limitation. Furthermore, the present disclosure is not limited to a particular implementation. For example, one or more actions of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

While some portions of this disclosure may make reference to "convention," or "related art," any such reference is merely for the purpose of providing context to the invention(s) of the instant disclosure, and does not form any admission, express or implied, as to what constitutes the state of the prior art. As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

What is claimed is:

1. A method for providing Individual Service Instance Identifier ("I-SID") translation for services residing on a second network being accessed from a first network, the method comprising:
   receiving, at a first edge network device of the first network, a packet that is directed to a first service instance of a service, wherein the first service instance is mapped to a first I-SID;
   determining, at the first edge network device, that the packet is addressed to a second edge network device of the second network;
   in response to determining that the packet is addressed to the second edge network device of the second network, determining, at the first edge network device and based on the first I-SID, a second I-SID that is different from the first I-SID and is mapped to a second service instance of the service, wherein the second service instance of the service resides on the second network, and wherein the determining the second I-SID comprises:
      accessing a table that stores mappings between I-SID values on the first network, and corresponding I-SID values on the second network; and
      retrieving, from the table, based on the first I-SID, a value for the second I-SID;
   in response to determining the second I-SID, updating a header of the packet to replace the first I-SID with the second I-SID; and
   transmitting the packet to the second network.

2. The method of claim 1, wherein transmitting the packet to the second network further comprises:
   determining whether the second I-SID is mapped to a Media Access Control ("MAC") address of the second edge network device of the second network; and
   in response to determining that the second I-SID is mapped to the MAC address of the second edge network device of the second network, updating the header of the packet to replace a Backbone Destination Address ("B-DA") with the MAC address of the second edge network device.

3. The method of claim 1, wherein the table is stored on the second edge network device.

4. The method of claim 1, wherein the table is stored on a device different from both the first edge network device and the second edge network device.

5. The method of claim 1, further comprising:
   detecting, using a pre-defined protocol on both the first network and the second network, the first service instance of the service and the second service instance of the service;
   identifying, on the first network, the first I-SID that is mapped to the first service instance of the service, and, on the second network, the second I-SID that is mapped to the second service instance of the service; and
   storing, in the table, the mapping between the first I-SID and the second I-SID.

6. The method of claim 5, wherein the table is stored on at least one of the first edge network device and the second edge network device.

7. The method of claim 5, further comprising:
   detecting, using the predefined protocol on the first network, a first Media Access Control ("MAC") address for addressing packets directed to the first I-SID, and, on the second network, a second MAC address for addressing packets directed to the second I-SID; and
   storing in the table the first MAC address corresponding to the first I-SID and the second MAC address corresponding to the second I-SID.

8. A system for providing Individual Service Instance Identifier ("I-SID") translation for services residing on a second network being accessed from a first network, the system comprising:
   communications circuitry; and
   control circuitry configured to:
      receive, at a first edge network device of the first network, a packet that is directed to a first service instance of a service, wherein the first service instance is mapped to a first I-SID;
      determine, at the first edge network device, that the packet is addressed to a second edge network device of the second network;
      in response to determining that the packet is addressed to the second edge network device of the second network, determine, at the first edge network device and based on the first I-SID, a second I-SID that is different from the first I-SID and is mapped to a second service instance of the service, wherein the second service instance of the service resides on the second network, and wherein to determine the second I-SID the control circuitry is configured to:

access a table that stores mappings between I-SID values on the first network and corresponding I-SID values on the second network; and
retrieve, from the table, based on the first I-SID, a value for the second I-SID;
in response to determining the second I-SID, update a header of the packet to replace the first I-SID with the second I-SID; and
transmit the packet to the second network.

9. The system of claim 8, wherein the control circuitry is further configured, when transmitting the packet to the second network, to:
determine whether the second I-SID is mapped to a Media Access Control ("MAC") address of the second edge network device of the second network; and
in response to determining that the second I-SID is mapped to the MAC address of the second edge network device of the second network, update the header of the packet to replace a Backbone Destination Address ("B-DA") with the MAC address of the second edge network device.

10. The system of claim 8, wherein the table is stored on the second edge network device.

11. The system of claim 8, wherein the table is stored on a device different from both the first edge network device and the second edge network device.

12. The system of claim 8, wherein the control circuitry is further configured to:
detect, using a pre-defined protocol on both the first network and the second network, the first service instance of the service and the second service instance of the service;
identify, on the first network, the first I-SID that is mapped to the first service instance of the service, and, on the second network, the second I-SID that is mapped to the second service instance of the service; and
store, in the table, the mapping between the first I-SID and the second I-SID.

13. The system of claim 12, wherein the table is stored on at least one of the first edge network device and the second edge network device.

14. The system of claim 12, wherein the control circuitry is further configured to:
detect, using the predefined protocol on the first network, a first Media Access Control ("MAC") address for addressing packets directed to the first I-SID, and, on the second network, a second MAC address for addressing packets directed to the second I-SID; and
store in the table the first MAC address corresponding to the first I-SID and the second MAC address corresponding to the second I-SID.

15. A non-transitory computer-readable medium having instructions encoded thereon for providing Individual Service Instance Identifier ("I-SID") translation for services residing on a second network being accessed from a first network, the instructions when executed by one or more processors causing the one or more processors to perform operations, the operations comprising:
receiving, at a first edge network device of the first network, a packet that is directed to a first service instance of a service, wherein the first service instance is mapped to a first I-SID;

determining, at the first edge network device, that the packet is addressed to a second edge network device of the second network;
in response to determining that the packet is addressed to the second edge network device of the second network, determining, at the first edge network device and using the first I-SID, a second I-SID that is different from the first I-SID and is mapped to a second service instance of the service, wherein the second service instance of the service resides on the second network, and wherein the determining the second I-SID comprises:
accessing a table that stores mappings between I-SID values on the first network and corresponding I-SID values on the second network; and
retrieving, from the table, based on the first I-SID, a value for the second I-SID;
in response to determining the second I-SID, updating a header of the packet to replace the first I-SID with the second I-SID;
in response to determining that the second I-SID is mapped to a Media Access Control ("MAC") address of the second edge network device of the second network, updating the header of the packet to replace a Backbone Destination Address ("B-DA") with the MAC address of the second edge network device; and
transmitting the packet to the second network.

16. The non-transitory computer-readable medium of claim 15, wherein the transmitting the packet to the second network comprises:
determining whether the second I-SID is mapped to the MAC address of the second edge network device of the second network.

17. The non-transitory computer-readable medium of claim 15, wherein the table is stored on the second edge network device.

18. The non-transitory computer-readable medium of claim 15, wherein the table is stored on a device different from both the first edge network device and the second edge network device.

19. The non-transitory computer-readable medium of claim 15, wherein the operations further comprise:
detecting, using a pre-defined protocol on both the first network and the second network, the first service instance of the service and the second service instance of the service;
identifying, on the first network, the first I-SID that is mapped to the first service instance of the service, and, on the second network, the second I-SID that is mapped to the second service instance of the service; and
storing, in the table, the mapping between the first I-SID and the second I-SID.

20. The non-transitory computer-readable medium of claim 19, wherein the operations further comprise:
detecting, using the predefined protocol on the first network, a first MAC address for addressing packets directed to the first I-SID, and, on the second network, the MAC address for addressing packets directed to the second I-SID; and
storing in the table the first MAC address corresponding to the first I-SID and the MAC address corresponding to the second I-SID.

* * * * *